(12) United States Patent　　(10) Patent No.:　US 12,637,567 B2
　　Kondo　　　　　　　　　　　　(45) **Date of Patent:　　*May 26, 2026**

(54) STYRENE-BASED RESIN COMPOSITION

(71) Applicant: IDEMITSU KOSAN CO., LTD.,
　　　　　　Tokyo (JP)

(72) Inventor: Ryosuke Kondo, Novi, MI (US)

(73) Assignee: IDEMITSU KOSAN CO., LTD.,
　　　　　　Tokyo (JP)

( * ) Notice: Subject to any disclaimer, the term of this patent is extended or adjusted under 35 U.S.C. 154(b) by 742 days.

This patent is subject to a terminal disclaimer.

(21) Appl. No.: 17/622,201

(22) PCT Filed: Jun. 22, 2020

(86) PCT No.: PCT/JP2020/024312
　　§ 371 (c)(1),
　　(2) Date: Dec. 22, 2021

(87) PCT Pub. No.: WO2020/262277

PCT Pub. Date: Dec. 30, 2020

(65) Prior Publication Data

US 2022/0389221 A1　Dec. 8, 2022

(30) Foreign Application Priority Data

Jun. 27, 2019　(JP) ................................. 2019-120130

(51) Int. Cl.
　　*C08L 77/06*　　　　(2006.01)
　　*C08K 5/098*　　　　(2006.01)
(52) U.S. Cl.
　　CPC ........... *C08L 77/06* (2013.01); *C08L 2205/03*
　　　　　　(2013.01); *C08L 2205/08* (2013.01)
(58) Field of Classification Search
　　CPC .......... C08K 5/098; C08L 77/06; C08L 25/06
　　See application file for complete search history.

(56) References Cited

U.S. PATENT DOCUMENTS

| | | | |
|---|---|---|---|
| 4,997,612 A | 3/1991 | Gianchandai et al. | |
| 6,013,709 A | 1/2000 | Masuyama et al. | |
| 6,657,008 B2 * | 12/2003 | Iwashita ................. | C08L 25/06 |
| | | | 525/183 |

| | | | |
|---|---|---|---|
| 2004/0132921 A1 * | 7/2004 | Fujimoto ............... | H01H 85/17 |
| | | | 525/418 |
| 2017/0114185 A1 | 4/2017 | Okamoto et al. | |
| 2021/0395521 A1 * | 12/2021 | Kondo ................. | C08L 71/126 |

FOREIGN PATENT DOCUMENTS

| | | | |
|---|---|---|---|
| CN | 104693630 A | | 6/2015 |
| CN | 105602135 A | * | 5/2016 |
| CN | 106164141 A | | 11/2016 |
| JP | H03-33155 A | | 2/1991 |
| JP | H08-319385 A | | 12/1996 |
| JP | 2000-063664 A | | 2/2000 |
| JP | 2000-256553 A | | 9/2000 |
| JP | 2005-248185 A | | 9/2005 |
| JP | 2006-282943 A | | 10/2006 |
| JP | 2008-266497 A | | 11/2008 |
| JP | 2013-014711 A | | 1/2013 |
| JP | 2015-199872 A | | 11/2015 |
| JP | 2018-070830 A | | 5/2018 |

OTHER PUBLICATIONS

Machine translation of CN 104693630 A, published Jun. 10, 2015.*
Office Action issued in corresponding Taiwanese Patent Application No. 109121451 dated May 6, 2024 (14 pages).
International Searching Authority, "International Search Report," issued in connection with International Patent Application No. PCT/JP2020/024312, dated Aug. 25, 2020.
International Searching Authority, "Written Opinion," issued in connection with International Patent Application No. PCT/JP2020/024312, dated Aug. 25, 2020.
Office Action issued in corresponding Chinese Patent Application No. 202080045149.5 dated Nov. 13, 2023 (15 pages).
Office Action issued in corresponding Japanese Patent Application No. 2021-526962 dated Nov. 7, 2023 (8 pages).
Office Action issued in corresponding Taiwanese Patent Application No. 109121451 dated Nov. 9, 2023 (16 pages).
Office Action issued in corresponding Korean Patent Application No. 10-2021-7041244 dated Mar. 20, 2025.

* cited by examiner

*Primary Examiner* — Vickey Nerangis
(74) *Attorney, Agent, or Firm* — Foley & Lardner LLP

(57)　　　　　ABSTRACT

A styrene resin composition includes: a resin (A) comprising a styrene resin (A1) having a syndiotactic structure and an aliphatic polyamide (A2); and 0.05 to 0.75% by mass of a metal salt (B) of a higher fatty acid. The mass ratio [(A1)/(A2)] between the styrene resin (A1) and the aliphatic polyamide (A2) in the resin (A) is 25/75 to 55/45.

12 Claims, No Drawings

STYRENE-BASED RESIN COMPOSITION

CROSS-REFERENCE TO RELATED APPLICATIONS

The present application claims priority under 37 U.S.C. § 371 to International Patent Application No. PCT/JP2020/024312, filed Jun. 22, 2020, which claims priority to and the benefit of Japanese Patent Application No. 2019-120130, filed on Jun. 27, 2019. The contents of these applications are hereby incorporated by reference in their entireties.

TECHNICAL FIELD

The present invention relates to a styrene resin composition.

BACKGROUND ART

A styrene resin having a syndiotactic structure (syndiotactic polystyrene hereinafter also referred to as SPS) has excellent properties such as mechanical strength, heat resistance, electrical properties, dimensional stability upon absorption of water, chemical resistance. An SPS is therefore very useful as a resin for use in various applications such as electrical or electronic device materials, automotive electrical components, home electric appliances, various machine parts, industrial materials.

Blending an SPS with other resin(s) has been studied in order to achieve a balance between properties such as strength, toughness, heat resistance, chemical resistance, moldability.

For example, patent document 1 discloses a polystyrene resin composition which is directed particularly to achieving high toughness and which comprises a styrene polymer having a syndiotactic structure, a rubbery elastomer, a polyamide, and an acid-modified polyphenylene ether.

With respect to a blend of a polyamide and a polystyrene resin, patent document 2 discloses a polyamide resin composition composed of a polyamide having a particular structure and a polystyrene resin, and a molded product thereof, which are directed to enhancing properties including heat resistance.

On the other hand, with a view to increasing the productivity of a resin molded product upon its production, the use of a fatty acid derivative has been studied. For example, patent document 3 discloses a polyamide resin composition comprising polyamide resin pellets. A lubricant, having a particular diameter and composed of a metal salt of a fatty acid, is attached to the surfaces of the polyamide resin pellets in order to increase the productivity of a molded product.

CITATION LIST

Patent Literature

Patent document 1: JP2005-248185A
Patent document 2: JP2000-256553A
Patent document 3: JP2006-282943A

SUMMARY OF INVENTION

Technical Problem

As described above, blending an SPS with a polyamide resin has recently been studied in order to achieve a balance between properties while taking advantage of the excellent properties of the SPS. For use in parts which are subject to an impact or vibration, such as electronic parts, automotive parts, mechanical products, dishes, such a resin blend is required to have higher toughness. Further, these days there is an increase in the use of such parts in a hot and humid environment or in an environment in which warm water or hot water is used. Therefore, in addition to high toughness, such parts are required to exhibit good mechanical properties, in particular hot water resistance, under such severe conditions. On the other hand, there has been the following problem. When such a resin blend is subjected to injection molding to produce a molded product, a deposit may remain in a mold and contaminate the mold, resulting in a decrease in the productivity. Therefore, a need exists for an increase in the productivity upon injection molding.

It is therefore an object of the present invention to provide a styrene resin composition which has excellent hot water resistance and which can prevent contamination of a mold upon molding of the composition.

Solution to Problem

The present inventors, through intensive studies, have found that the above problems can be solved by a resin composition comprising an SPS and an aliphatic polyamide at a particular ratio, and containing a particular amount of a metal salt of a higher fatty acid. Thus, the present invention relates to the following [1] to [15].

[1] A styrene resin composition comprising: a resin (A) comprising a styrene resin (A1) having a syndiotactic structure and an aliphatic polyamide (A2); and 0.05 to 0.75% by mass of a metal salt (B) of a higher fatty acid, wherein the mass ratio [(A1)/(A2)] between the styrene resin (A1) and the aliphatic polyamide (A2) in the resin (A) is 25/75 to 55/45.

[2] The styrene resin composition as described in [1], wherein the aliphatic polyamide (A2) is polyamide 66.

[3] The styrene resin composition as described in [1] or [2], wherein the metal salt (B) of a higher fatty acid is a metal salt of stearic acid.

[4] The styrene resin composition as described in any one of [1] to [3], wherein the metal salt (B) of a higher fatty acid is aluminum stearate.

[5] The styrene resin composition as described in any one of [1] to [4], further comprising a compatibilizer (C) which is compatible with the styrene resin (A1), and has a polar group reactive with the aliphatic polyamide (A2).

[6] The styrene resin composition as described in [5], wherein the polar group reactive with the polyamide (A2), contained in the compatibilizer (C), is at least one selected from an acid anhydride group, a carboxylic acid group, a carboxylic acid ester group, a carboxylic acid halide group, a carboxylic acid amide group, a carboxylate group, a sulfonic acid group, a sulfonic acid ester group, a sulfonic acid chloride group, a sulfonic acid amide group, a sulfonate group, an epoxy group, an amino group, an imide group, and an oxazoline group.

[7] The styrene resin composition as described in [5] or [6], wherein the compatibilizer (C) includes, as a main chain or a graft chain of the polymer chain, at least one selected from polystyrene, polyphenylene ether and polyvinyl methyl ether.

[8] The styrene resin composition as described in any one of [5] to [7], wherein the compatibilizer (C) is at least one selected from a modified polyphenylene ether and a modified polystyrene.

[9] The styrene resin composition as described in any one of [1] to [8], further comprising an inorganic filler (D).

[10] The styrene resin composition as described in [9], wherein the inorganic filler (D) has been treated with a silane coupling agent or a titanium coupling agent.

[11] The styrene resin composition as described in [9] or [10], wherein the inorganic filler (D) is a glass filler.

[12] The styrene resin composition as described in [11], wherein the glass filler is at least one selected from glass fibers, glass powder, glass flakes, milled fibers, glass cloth, and glass beads.

[13] The styrene resin composition as described in any one of [1] to [12], further comprising an antioxidant (E).

[14] The styrene resin composition as described in [13], wherein the antioxidant (E) is at least one selected from a copper compound, an iodine compound, a phosphorus compound, a phenol compound, and a sulfur compound.

[15] A molded product comprising the styrene resin composition as described in any one of [1] to [14].

Advantageous Effects of Invention

The styrene resin composition of the present invention has, in particular, excellent hot water resistance as defined by the tensile strength measured after immersion of the composition in hot water, and can prevent contamination of a mold upon molding of the composition.

DESCRIPTION OF EMBODIMENTS

The styrene resin composition of the present invention comprises: a resin (A) comprising a styrene resin (A1) having a syndiotactic structure and an aliphatic polyamide (A2); and 0.05 to 0.75% by mass of a metal salt (B) of a higher fatty acid, wherein the mass ratio [(A1)/(A2)] between the styrene resin (A1) and the aliphatic polyamide (A2) in the resin (A) is 25/75 to 55/45.

The respective components and features will now be described in detail.

[Resin (A)]

The resin (A) contained in the styrene resin composition of the present invention comprises a styrene resin (SPS) (A1) having a syndiotactic structure and an aliphatic polyamide (A2). The mass ratio [(A1)/(A2)] between the styrene resin (A1) and the aliphatic polyamide (A2) in the resin (A) is 25/75 to 55/45.

If the mass ratio between the styrene resin (A1) and the aliphatic polyamide (A2) in the resin (A) is less than 25/75, the hot water resistance of the composition is unfavorably low. If the mass ratio between the SPS (A1) and the aliphatic polyamide (A2) in the resin (A) is more than 55/45, mechanical properties of the composition, such as tensile elongation at break, is low. The elongation at break especially in the initial condition of the tensile test is unfavorably low.

The mass ratio [(A1)/(A2)] between the styrene resin (A1) and the aliphatic polyamide (A2) in the resin (A) is preferably 25/75 to 50/50, more preferably 25/75 to 40/60, and even more preferably 25/75 to 35/65 from the viewpoint of enhancing the initial mechanical property and the hot water resistance. On the other hand, the mass ratio [(A1)/(A2)] is preferably 29/71 to 55/45, more preferably 35/65 to 55/45, and even more preferably 40/60 to 55/45 from the viewpoint of enhancing mechanical properties such as tensile strength.

The content of the resin (A) in the styrene resin composition of the present invention is preferably 50 to 95% by mass. The content of the resin (A) in the styrene resin composition is more preferably not less than 60% by mass, even more preferably not less than 65% by mass, and still more preferably not less than 70% by mass. On the other hand, the content of the resin (A) in the styrene resin composition is more preferably not more than 90% by mass, even more preferably not more than 85% by mass, and still more preferably not more than 80% by mass. When the content of the resin (A) is in the above ranges, the resin composition can prevent contamination of a mold while maintaining the hot water resistance.

<Styrene Resin (A1) Having a Syndiotactic Structure>

The styrene resin (A1) is an SPS having a highly syndiotactic structure. As used herein, "syndiotactic" means that a high proportion of phenyl rings in adjacent styrene units which are arranged alternately (hereinafter referred to as syndiotacticity) with respect to a plane formed by the main chain of the polymer block.

The tacticity can be quantitatively determined by the nuclear magnetic resonance method ($^{13}$C-NMR method) using isotopic carbon. The proportions of consecutive constitutional units, for example, consecutive two monomer units as a diad, consecutive three monomer units as a triad, and consecutive five monomer units as a pentad, can be quantitatively determined by the $^{13}$C-NMR method.

In the present invention, the "styrene resin having a highly syndiotactic structure" refers to a styrene polymer such as a polystyrene, a poly(hydrocarbon-substituted styrene), a poly(halostyrene), a poly(haloalkylstyrene), a poly(alkoxystyrene) or a poly(vinyl benzoate ester), a hydrogenated polymer or a mixture thereof, or a copolymer comprising such a constituent unit as a main component, each having such syndiotacticity that the proportion of a racemic diad (r) is generally not less than 75% by mol, preferably not less than 85% by mol, or the proportion of a racemic pentad (rrrr) is generally not less than 30% by mol, preferably not less than 50% by mol.

Examples of the poly(hydrocarbon-substituted styrene) include poly(methylstyrene), poly(ethylstyrene), poly(isopropylstyrene), poly(tert-butylstyrene), poly(phenyl)styrene, poly(vinylnaphthalene), and poly(vinylstyrene). Examples of the poly(halostyrene) include poly(chlorostyrene), poly(bromostyrene), and poly(fluorostyrene). An example of the poly(haloalkylstyrene) is poly(chloromethylstyrene). Examples of the poly(alkoxystyrene) include poly(methoxystyrene) and poly(ethoxystyrene).

Examples of the comonomer components of the copolymer comprising such a constituent unit include, besides the monomers of the above styrene polymers, olefin monomers such as ethylene, propylene, butene, hexene, and octene; diene monomers such as butadiene and isoprene; and polar vinyl monomers such as cyclic olefin monomers, cyclic diene monomers, methyl methacrylate, maleic anhydride, and acrylonitrile.

Examples of preferable copolymers for use as the styrene resin (A1) include a copolymer of styrene and p-methylstyrene, a copolymer of styrene and p-tert-butylstyrene, and a copolymer of styrene and divinylbenzene. Among them, a copolymer of styrene and p-methylstyrene is preferred.

Among the above-listed styrene resins, at least one selected from polystyrene, poly(p-methylstyrene), poly(m-methylstyrene), poly(p-tert-butylstyrene), poly(p-chlorostyrene), poly(m-chlorostyrene), poly(p-fluorostyrene), and a copolymer of styrene and p-methylstyrene is preferred, at least one selected from polystyrene, poly(p-methylstyrene), poly(m-methylstyrene), and a copolymer of styrene and p-methylstyrene is more preferred, and polystyrene and/or a copolymer of styrene and p-methylstyrene is even more preferred.

The SPS (A1) preferably has a weight average molecular weight of not less than $1 \times 10^4$ and not more than $1 \times 10^6$, more preferably not less than 50,000 and not more than 500,000 from the viewpoint of the fluidity of the resin upon molding and the strength of the resulting molded product. When the weight average molecular weight is not less than $1 \times 10^4$, a molded product having a sufficient strength can be obtained. When the weight average molecular weight is not more than $1 \times 10^6$, there will be no problem in the fluidity of the resin upon molding.

Unless otherwise specified, "weight average molecular weight" herein refers to a value as determined in terms of a standard polystyrene, using a calibration curve thereof, from a measured value. The measured value is obtained by gel permeation chromatography as performed at 145° C. by using a GPC apparatus (HLC-8321 GPC/HT) manufactured by Tosoh Corporation, a GPC column (GMHHR-H(S)HTC/HT) manufactured by Tosoh Corporation, and 1,2,4-trichlorobenzene as an eluent.

The SPS (A1) preferably has a melt flow rate (MFR), as measured at a temperature of 300° C. under a load of 1.2 kg, of not less than 2 g/10 min, more preferably not less than 4 g/10 min, and preferably not more than 50 g/10 min, more preferably not more than 30 g/10 min. When the MFR of the SPS (A1) is not less than 2 g/10 min, there is no problem in the fluidity of the composition upon molding. When the MFR of the SPS (A1) is not more than 50 g/10 min, preferably not more than 30 g/10 min, a molded product having satisfactory mechanical properties can be obtained.

The SPS (A1) can be produced, for example, by polymerizing a styrene monomer (corresponding to the styrene polymer) using, as a catalyst, a titanium compound and a condensation product of a trialkylaluminum with water (aluminoxane) in an inert hydrocarbon solvent or in the absence of a solvent (see, e.g., JP2009-068022A).

<Aliphatic Polyamide (A2)>

Any known aliphatic polyamide can be used as the aliphatic polyamide constituting the styrene resin composition of the present invention.

The aliphatic polyamide is a polymer obtained by polymerization of an aliphatic diamine component and an aliphatic dicarboxylic acid component, or polymerization of an aliphatic aminocarboxylic acid.

Examples of the aliphatic polyamide include polyamide 4, polyamide 6, polyamide 66, polyamide 34, polyamide 12, polyamide 11, and polyamide 610. Polyamide 6 and polyamide 66 are preferred, and polyamide 66 is more preferred.

While these polyamides as the aliphatic polyamide (A2) may be used either singly or in a combination of two or more in the styrene resin composition of the present invention, they are preferably used singly.

[Metal Salt (B) of Higher Fatty Acid]

The styrene resin composition of the present invention contains 0.05 to 0.75% by mass of the metal salt (B) of a higher fatty acid.

The content of the metal salt (B) of a higher fatty acid in the styrene resin composition is 0.05 to 0.75% by mass, preferably 0.05 to 0.50% by mass, more preferably 0.05 to 0.30% by mass, even more preferably 0.07 to 0.20% by mass, and still more preferably 0.08 to 0.15% by mass.

When the content of the metal salt of a higher fatty acid is 0.05 to 0.75% by mass, "mold deposit" can be effectively prevented upon molding of the composition. Furthermore, the resulting molded product has excellent strength and hot water resistance.

While it is not known exactly why the inclusion of the particular amount of the metal salt of a higher fatty acid in the styrene resin composition can effectively prevent "mold deposit" upon molding of the composition, the following may be considered. Crystallization and deposition of a cyclic structure, derived from an aliphatic polyamide and contained in an out-gas generated during molding, is considered to be a cause of "mold deposit". When the styrene resin composition of the present invention is subjected to molding, a gas derived from the metal salt of a higher fatty acid is generated together with a gas derived from the aliphatic polyamide. The metal salt-derived gas will prevent crystallization of the cyclic structure derived from the aliphatic polyamide, thereby preventing deposition of a needle crystal.

In the styrene resin composition of the present invention, the proportion of the gas derived from the metal salt (B) of a higher fatty acid to the total amount of the out-gases is preferably 10 to 50%, more preferably 20 to 50%, and even more preferably 30 to 40% from the viewpoint of effectively preventing "mold deposit".

The proportion of the gas derived from the metal salt (B) of a higher fatty acid to the total amount of the out-gases can be determined by heating the styrene resin composition, and determining the total amount of the out-gases and the amount of the gas derived from a higher fatty acid by means of gas chromatography, and in particular by the method described in the working examples.

The fatty acid of the metal salt (B) of a higher fatty acid preferably has 16 to 22 carbon atoms, more preferably 16 to 18 carbon atoms, and even more preferably 18 carbon atoms. Examples include palmitic acid, stearic acid, arachidic acid, and behenic acid. Stearic acid is preferred.

The metal of the metal salt is preferably a divalent or trivalent representative element (main group element) metal. Examples include aluminum, calcium, zinc, and magnesium. Aluminum is preferred.

The melting point of the metal salt (B) of a higher fatty acid is preferably 100 to 200° C.

Examples of the metal salt (B) of a higher fatty acid include metal salts of stearic acid such as aluminum stearate, calcium stearate, zinc stearate, magnesium stearate, and lead stearate. Among them, aluminum stearate and calcium stearate are preferred, and aluminum stearate is more preferred.

[Compatibilizer (C)]

The styrene resin composition of the present invention preferably contains a compatibilizer (C) which is compatible with the styrene resin (A1), and has a polar group reactive with the aliphatic polyamide (A2).

The compatibilizer (C) is used to enhance the compatibility between the SPS (A1) and the aliphatic polyamide (A2), finely disperse the domains, and increase the interfacial strengths between the respective components.

The compatibilizer (C), which is compatible with the SPS (A1), preferably has a structure which contributes to the compatibility and which contains, in the polymer chain, a chain having compatibility with the SPS.

For example, the structure contains, as a main chain or a graft chain of the polymer chain, polystyrene, polyphenylene ether or polyvinyl methyl ether, preferably polyphenylene ether.

Thus, the compatibilizer (C) preferably includes, as a main chain or a graft chain of the polymer chain, at least one selected from polystyrene, polyphenylene ether and polyvinyl methyl ether, more preferably polyphenylene ether.

The polar group reactive with the polyamide (A2) refers to a functional group reactive with a polar group of the polyamide. Examples of preferable functional groups include at least one selected from an acid anhydride group, a carboxylic acid group, a carboxylic acid ester group, a carboxylic acid halide group, a carboxylic acid amide group, a carboxylate group, a sulfonic acid group, a sulfonic acid ester group, a sulfonic acid chloride group, a sulfonic acid amide group, a sulfonate group, an epoxy group, an amino group, an imido group, and an oxazoline group. Among them, an acid anhydride group and/or a carboxylic acid group is more preferred.

The compatibilizer (C) may be at least one selected from a modified polyphenylene ether and a modified polystyrene. A modified polyphenylene ether is preferred.

Examples of the modified polyphenylene ether include fumaric acid-modified polyphenylene ether, maleic anhydride-modified polyphenylene ether, a (styrene-maleic anhydride)-polyphenylene ether graft copolymer, glycidyl methacrylate-modified polyphenylene ether, and amine-modified polyphenylene ether. Among them, fumaric acid-modified polyphenylene ether and maleic anhydride-modified polyphenylene ether are preferred, and fumaric acid-modified polyphenylene ether is more preferred.

The above-described modified polyphenylene ether can be obtained by modifying a known polyphenylene ether with a modifier; however, the method for obtaining the modified polyphenylene ether is not limited to this method as long as the polymer can be used for the purpose of the present invention. Polyphenylene ether is a known compound, and reference may be made to U.S. Pat. Nos. 3,306,874, 3,306, 875, 3,257,357 and 3,257,358. Polyphenylene ether is commonly prepared through an oxidative coupling reaction using a di- or tri-substituted phenol in the presence of a copper-amine complex catalyst. The copper-amine complex may be one derived from a primary, secondary or tertiary amine.

Examples of polyphenylene ether include poly(2,6-dimethyl-1,4-phenylene ether), poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly[2-(4'-methylphenyl)-1,4-phenylene ether], poly(2-bromo-6-phenyl-1,4-phenylene ether), poly(2-methyl-6-phenyl-1,4-phenylene ether), poly(2-phenyl-1, 4-phenylene ether), poly(2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), and poly(2,6-diethyl-1,4-phenylene ether). Among them, poly(2,6-dimethyl-1,4-phenylene ether) is preferred.

It is possible to use a copolymer derived from two or more phenol compounds which can be used for the preparation of polyphenylene ether, or a copolymer of a vinyl aromatic compound, such as polystyrene, and polyphenylene ether.

A modifier for modification of polyphenylene ether may be a compound having an ethylenic double bond and a polar group in one molecule. Examples of such a compound include maleic anhydride, maleic acid, fumaric acid, a maleic acid ester, a fumaric acid ester, maleimide and an N-substituted derivative thereof, a maleic acid salt, a fumaric acid salt, acrylic acid, an acrylic acid ester, acrylamide, an acrylic acid salt, methacrylic acid, a methacrylic acid ester, methacrylamide, a methacrylic acid salt, and glycidyl methacrylate. Among them, maleic anhydride, fumaric acid and glycidyl methacrylate are preferred. These modifiers may be used singly or in a combination of two or more.

A modified polyphenylene ether can be obtained, for example, by reacting a polyphenylene ether with the modifier in the presence of a solvent or another resin. There is no particular limitation on a method for the modification, and any known method can be used. Exemplary methods include a method which involves melting and kneading the materials at a temperature in the range of 150 to 350° C. by using a roll mill, a Banbury mixer, an extruder, or the like to perform a reaction, and a method which involves heating the materials in a solvent such as benzene, toluene or xylene to perform a reaction. In order to facilitate the reaction, it is effective to allow a radical generator to exist in the reaction system. Examples of the radical generator include benzoyl peroxide, di-tert-butyl peroxide, dicumyl peroxide, tert-butyl peroxybenzoate, azobisisobutyronitrile, azobisisovaleronitrile and 2,3-diphenyl-2,3-dimethylbutane. A method comprising melting and kneading the materials in the presence of such a radical generator is more preferred.

Examples of the modified polystyrene include a modified SPS, a styrene-maleic anhydride copolymer, a styrene-glycidyl methacrylate copolymer, carboxylic acid-terminated polystyrene, epoxy-terminated polystyrene, oxazoline-terminated polystyrene, amine-terminated polystyrene, sulfonated polystyrene, a styrenic ionomer, a styrene-methyl methacrylate graft polymer, a (styrene-glycidyl methacrylate)-methyl methacrylate graft copolymer, an acid-modified acrylate-styrene graft polymer, a (styrene-glycidyl methacrylate)-styrene graft polymer, and a polybutylene terephthalate-polystyrene graft polymer. Among them, a modified SPS is preferred.

The modified SPS preferably has a polar group. Examples of such a modified SPS include maleic anhydride-modified SPS, fumaric acid-modified SPS, glycidyl methacrylate-modified SPS, and amine-modified SPS.

The content of the compatibilizer (C) in the styrene resin composition is preferably not less than 1.0% by mass and not more than 10.0% by mass. When the content of the compatibilizer (B) is not less than 1.0% by mass, the composition can have excellent mechanical strength, and is excellent in the productivity of a molded product. When the content of the compatibilizer (C) is not more than 10.0% by mass, a molded product can keep good chemical resistance. The content of the compatibilizer (C) in the styrene resin composition is more preferably not less than 1.5% by mass, and even more preferably not less than 2.0% by mass, while it is more preferably not more than 5.0% by mass, and even more preferably not more than 4.0% by mass.

[Inorganic Filler (D)]

The styrene resin composition of the present invention preferably contains an inorganic filler (D).

The inorganic filler (D) may have a fibrous form, a granular form, a powdery form, etc.

Examples of the fibrous filler include glass fibers, carbon fibers, whiskers, ceramic fibers, and metal fibers. Glass fibers are preferred.

The whiskers may be made of boron, alumina, silica, silicon carbide, or the like.

The ceramic fibers may be made of gypsum, potassium titanate, magnesium sulfate, magnesium oxide, or the like.

The metal fibers may be made of copper, aluminum, steel, or the like.

The inorganic filler may have a cloth shape, a mat shape, a cut-bundle shape, a short-fiber shape, a filament shape, or a whisker shape. In the case a cut-bundle shape, its length is preferably 0.05 to 50 mm, and its fiber diameter is preferably 5 to 20 μm. In the case of a cloth or mat shape, its length is preferably not less than 1 mm, more preferably not less than 5 mm.

The granular or powdery filler may be composed of talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide, metal powder, glass powder, glass flakes, glass beads, or the like. Among them, glass powder, glass flakes or glass beads are preferred.

The inorganic filler (D) is preferably a glass filler.

The glass filler is more preferably at least one selected from glass fibers, glass powder, glass flakes, milled fibers, glass cloth, and glass beads, and is even more preferably glass fibers because the composition can have excellent mechanical strength.

Example of the glass filler include E glass, C glass, S glass, D glass, ECR glass, A glass, and AR glass. Glass containing no boron oxide can also be used.

The glass fibers preferably have a length of 0.05 to 50 mm and a diameter of 5 to 20 μm.

In order to increase adhesion of the inorganic filler (D) to the SPS (B), the inorganic filler (D) is preferably surface-treated with a coupling agent, more preferably with a silane coupling agent or a titanium coupling agent and, from the viewpoint of compatibility with the resin components, is even more preferably surface-treated with a silane coupling agent.

Specific examples of the silane coupling agent include triethoxysilane, vinyltris(β-methoxyethoxy)silane, γ-methacryloxypropyltrimethoxysilane, γ-glycidoxypropyltrimethoxysilane, β-(1,1-epoxycyclohexyl)ethyltrimethoxy silane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, γ-chloropropyltrimethoxysilane, γ-aminopropyltrimethoxysilane, γ-aminopropyl-tris(2-methoxy-ethoxy)silane, N-methyl-γ-aminopropyltrimethoxysilane, N-vinylbenzyl-γ-aminopropyl triethoxysilane, 3-ureidopropyltrimethoxysilane, 3-4,5-dihydroimidazole-propyltriethoxysilane, hexamethyldisilazane, N,N-bis(trimethylsilyl)urea, and 3-triethoxysilyl-N-(1,3-dimethylbutylidene)propylamine. Among them, aminosilanes and epoxysilanes, such as γ-aminopropyltrimethoxysilane, N-β-(aminoethyl)-γ-aminopropyltrimethoxysilane, γ-glycidoxypropyltrimethoxy silane and β-(3,4-epoxycyclohexyl)ethyltrimethoxysilane, are preferred.

Specific examples of the titanium coupling agent include isopropyltriisostearoyl titanate, isopropyltridodecylbenzenesulfonyl titanate, isopropyltris(dioctylpyrophosphate) titanate, tetraisopropylbis (dioctylphosphite) titanate, tetraoctylbis(ditridecylphosphite) titanate, tetra(1,1-diallyloxymethyl-1-butyl)bis(ditridecyl)phosphite titanate, bis(dioctylpyrophosphate)oxyacetate titanate, bis(dioctylpyrophosphate)ethylene titanate, isopropyltrioctanoyl titanate, isopropyldimethacrylisostearoyl titanate, isopropylisostearoyldiacryl titanate, isopropyltri(dioctylphosphate)

titanate, isopropyltricumylphenyl titanate, isopropyltri(N-amidoethyl, aminoethyl) titanate, dicumylphenyloxyacetate titanate, and diisostearoylethylene titanate. Among them, isopropyltri(N-amidoethyl, aminoethyl) titanate is preferred.

The surface treatment of the inorganic filler using the above-described coupling agent can be performed by any known common method. Exemplary methods include a sizing treatment which involves applying to the filler a solution or suspension of the coupling agent in an organic solvent, dry mixing, a spray method, an integral blending method, and a dry concentrate method. Among them, a sizing treatment, dry mixing, and a spray method are preferred.

The content of the inorganic filler (D) in the resin composition is preferably not less than 1% by mass and not more than 30% by mass. When the amount of the inorganic filler (D) is not less than 1% by mass, the composition can have satisfactory rigidity upon demolding. When the amount of the inorganic filler (D) is not more than 30% by mass, the inorganic filler (D) does not adversely affect the mechanical properties of the styrene resin composition. The content of the inorganic filler (D) in the resin composition is more preferably not less than 3% by mass, even more preferably not less than 5% by mass, still more preferably not less than 10% by mass, and yet more preferably not less than 15% by mass, while it is more preferably not more than 25% by mass, and even more preferably not more than 22% by mass.

[Antioxidant (E)]

The styrene resin composition of the present invention preferably contains an antioxidant (E).

At least one selected from a copper compound, an iodine compound, a phosphorus compound, a phenol compound, and a sulfur compound is preferably used as the antioxidant (E). A copper compound, an iodine compound and/or a phenol compound is more preferably used from the viewpoint of heat resistance.

The copper compound may be an inorganic copper halide, a copper salt of an inorganic acid, a copper salt of an organic acid, or a copper complex compound. An inorganic copper halide or a copper salt of an inorganic acid is preferred, and an inorganic copper halide is more preferred.

Examples of the inorganic copper halide include copper chloride, copper bromide and copper iodide.

Examples of the copper salt of an inorganic acid include copper sulfate, copper nitrate and copper phosphate.

Examples of the copper salt of an organic acid include acetate, copper salicylate, copper stearate, copper oleate, copper benzoate, copper formate, copper propionate, copper oxalate, copper sebacate, copper lactate, copper montanite, copper adipate, copper isophthalate, copper pyrophosphate, and ammoniacal copper.

The copper complex compound may be one formed from an inorganic copper halide and xylylenediamine, benzimidazole, 2-mercaptobenzimidazole, or the like.

Among them, copper chloride, copper bromide, copper iodide and copper nitrate are preferred. The above-listed copper compounds may be used singly or in a combination of two or more.

Examples of the iodine compound include potassium iodide, magnesium iodide and ammonium iodide. Elemental iodine may also be used. Such iodine compounds may be used singly or in a combination of two or more. The antioxidant (E) preferably comprises a copper compound and an iodine compound, more preferably copper iodide and potassium iodide.

Examples of the phosphorus compound include mono- or diphosphites such as tris(2,4-di-tert-butylphenyOphosphite and tris(mono- and dinonylphenyl)phosphite.

Examples of the phenol antioxidant include 2,6-di-tert-butyl-4-methylphenol, 2,6-diphenyl-4-methoxyphenol, 2,2'-methylenebis(6-tert-butyl-4-methylphenol), 2,2'-methylen-ebis[4-methyl-6-(α-methylcyclohexyl)phenol], 1,1-bis(5-te-rt-butyl-4-hydroxy-2-methylphenyl)butane, 2,2'-methylen-ebis(4-methyl-6-cyclohexylphenol), 2,2'-methylenebis(4-methyl-6-nonylphenol), 1,1,3-tris(5-tert-butyl-4-hydroxy-2-methylphenyl)butane, 2,2-bis(5-tert-butyl-4-hydroxy-2-methylphenyl)-4-n-dodecylmercaptobutane, ethylene glycol bis[3,3-bis(3-tert-butyl-4-hydroxyphenyl)butyrate], 1,1-bis (3,5-dimethyl-2-hydroxyphenyl)-3-(n-dodecylthio)butane, 4,4'-thiobis(6-tert-butyl-3-methylphenol), 1,3,5-tris(3,5-di-tert-butyl-4-hydroxybenzyl)-2,4,6-trimethylbenzene, dioc-tadecyl 2,2-bis(3,5-di-tert-butyl-4-hydroxybenzyl)malonate, n-octadecyl-3-(4-hydroxy-3,5-di-tert-butylphenyl)propi-onate, and pentaerythritol tetrakis{3-(3,5-di-tert-butyl-4-hy-droxyphenyl)propionate}.

The styrene resin composition may contain one or more of the above-listed antioxidants as the antioxidant. The content of the antioxidant in the styrene resin composition is preferably not less than 0.05% by mass, more preferably not less than 0.1% by mass, and even more preferably not less than 0.15% by mass. The content of the antioxidant is preferably not more than 2.0% by mass, more preferably not more than 1.0% by mass, and even more preferably not more than 0.5% by mass. When the content of the antioxidant is not less than 0.05% by mass, a molded product can have good long-term heat resistance. When the content of the antioxidant is not more than 2.0% by mass, the antioxidant can be prevented from bleeding from a molded product and adversely affect-ing the appearance of the molded product.

Other Components

The styrene resin composition of the present invention may contain other components which are common additives, such as a crosslinking agent, a crosslinking aid, a nucleating agent, a plasticizer, a mold release agent, a colorant and/or an antistatic agent, as long as the intended effect of the present invention is not impaired.

The nucleating agent may be any known one selected from a metal salt of a carboxylic acid, including aluminum di(p-tert-butylbenzoate), a metal salt of phosphoric acid, including sodium methylenebis(2,4-di-tert-butylphenol) phosphate, a phthalocyanine derivative, etc.

The mold release agent may be any known one selected from a polyethylene wax, a silicone oil, a long-chain car-boxylic acid, etc.

[Molded Product]

The styrene resin composition of the present invention is obtained by blending and kneading the resin (A), the metal salt (B) of a higher fatty acid, and the above-described other components as needed. The blending and kneading can be performed by a method comprising pre-mixing the compo-nents by using a common mixer such as a ribbon blender, a drum tumbler, or a Henschel mixer, and then mixing and kneading the components by using a Banbury mixer, a single-screw extruder, a twin-screw extruder, a multi-screw extruder, a co-kneader, or the like.

Various molded products can be produced by injection molding, injection compression molding, extrusion mold-ing, blow molding, press molding, vacuum molding, foam molding, or the like using, as a raw material, the melt-kneaded styrene resin composition of the present invention or its pellets. The thus-produced molded products comprise the styrene resin composition of the present invention. In particular, such pellets can be advantageously used to pro-duce an injection-molded product by injection molding or injection compression molding.

The styrene resin composition of the present invention has excellent hot water resistance, and can prevent contamina-tion of a mold upon molding of the composition. Therefore, a molded product comprising the styrene resin composition of the present invention can be advantageously used in such applications as an automotive sensor, housing or connector, a magnetic valve of an exhaust brake for a large-sized automobile, an LED display component that produces heat, automotive illumination, a signal lamp, an emergency light, a terminal block, a fuse component, and a high-voltage component, and particularly for an automotive connector.

EXAMPLES

The following examples illustrate the present invention in greater detail and are not intended to limit the scope of the invention.

<I> Production of Pellets

Components other than the inorganic filler (D) were dry-blended in a Henschel mixer in proportions described in Table 1. Subsequently, using a twin-screw kneader (TEM 35B manufactured by Toshiba Machine Co., Ltd.) having a cylinder diameter of 37 mm, the resin composition was kneaded at a screw rotating speed of 200 rpm and at a barrel temperature of 330° C. while side-feeding the inorganic filler (D) in a proportion described in Table 1 to produce pellets. The resulting pellets were dried at 80° C. for 5 hours using a hot-air dryer.

For dried pellets (resin composition) obtained in the above-described manner in Examples and Comparative Examples, the following property evaluations were per-formed.

(1) Mold Contamination

Using an injection molding machine [SH100A manufac-tured by Sumitomo Heavy Industries, Ltd.], the pellets obtained in <I> above were subjected to injection molding under the following molding conditions: cylinder tempera-ture 290° C.; mold temperature 80° C.; and molding cycle 40 seconds (cooling time 18 seconds). After performing 500 molding operations by a short shot method using a mold insert for evaluation of deposit in a square plate-like speci-men having a size of 80 mm×80 mm×2 mm, a mold deposit was visually observed and evaluated according to the fol-lowing criteria:

A: While a very small amount of an oily deposit was observed, there was no needle crystal deposit B: While a small amount of an oily deposit was observed, there was no needle crystal deposit C: A small amount of a needle crystal deposit was observed D: A large amount of a needle crystal deposit was observed E: A very large amount of a needle crystal deposit was observed The rating A or B indicates little mold contamination, thus indicating that successive molding operations are possible.

(2) Tensile Strength Retention after Immersion in Hot Water (Hot Water Resistance)

Using an injection molding machine [SH100A manufac-tured by Sumitomo Heavy Industries, Ltd.], the pellets obtained in <I> above were subjected to injection molding under the following molding conditions: cylinder temperature 290° C.; mold temperature 80° C.; and molding cycle 38 seconds (cooling time 18 seconds). Dumbbell tensile specimens (type A) were produced by the injection molding according to JIS K 7139: 2015. The specimens were each attached to a tensile tester (manufactured by Shimadzu Corp., trade name: Autograph AG5000B), and a tensile test was performed according to ISO 527-1: 2012 (2nd Edition) under the following conditions: initial distance between chucks 100 mm; tensile speed 5 mm/min; and room temperature. Further, each specimen was placed in a pressure cooker, and held in the cooker at 120° C. for 400 hours. Thereafter, the tensile strength of the specimen was measured in the above-described manner to determine the strength retention (%) of the specimen. Evaluation of the property retention was performed according to the following criteria.

A: not less than 60%
B: not less than 57% and less than 60%
C: not less than 53% and less than 57%
D: not less than 50% and less than 53%
E: less than 50%

The rating A, B or C indicates excellent hot water resistance.

(3) Retention of Elongation at Break after Immersion in Hot Water

For the resin compositions (pellets) of Examples, the retention of elongation at break was also measured simultaneously with the measurement of the tensile strength retention described in (2) above.

When the retention of elongation at break after immersion in hot water is high, the composition is excellent in the toughness. Thus, an article such as a molded product is unlikely to be broken even when an external forth is applied to the article.

(4) Proportion of Gas Derived from Salt of Higher Fatty Acid to the Total Amount of Out-Gases The pellets obtained in <I> above were pulverized, and 10 mg of the pulverized product was subjected to gas chromatography using a gas chromatograph (TDU-GC) equipped with a thermal desorption unit to measure the amount of out-gases from the resin composition under the following conditions. The proportion (%) of a gas derived from a salt of higher fatty acid to the total amount of out-gases was calculated from the peak area derived from aluminum stearate.

(Measurement Conditions)

Gas chromatograph (GC apparatus): GC 7890B (manufactured by Agilent Technologies)
Thermal desorption unit: TDU (manufactured by Gerstel)
Column DB-5MS (30 m×0.25 mm i.d. df=0.25 μm)
TDU conditions: 50° C. (0.01 min)→720° C./min→310° C. or 330° C. (10 min), splitless
CIS conditions: −50° C. (0.01 min)→12° C./sec→350° C. (5 min), split
Oven temperature conditions: 50° C. (5 min)→10° C./min→330° C. (10 min)
Carrier gas flow rate: He, 1 mL/min
Detector (FID) temperature: 330° C.
Quantitative determination method: the quantitative determination of the peak derived from aluminum stearate was performed by the absolute calibration method using stearic acid as a reference material.

Examples 1 to 3 and Comparative Examples 1 to 7

Components were blended and kneaded in the proportions (mass %) described in Table 1 to prepare pellets in the above-described manner. The pellets were subjected to the above-described evaluation tests. The components used are as follows.

SPS (A1): [XAREC 90ZC manufactured by Idemitsu Kosan Co., Ltd., weight average molecular weight 200,000, MFR 9.0 g/10 min (temperature 300° C., load 1.2 kg)]
Aliphatic polyamide (A2): Nylon 66 [Vydyne (registered trademark) 50BWFS manufactured by Ascend Performance Materials]
Metal salt (B) of higher fatty acid: aluminum stearate [M-13211G manufactured by FACI]
Compatibilizer (C): fumaric acid-modified polyphenylene ether [CX-1 manufactured by Idemitsu Kosan Co., Ltd.]
Inorganic filler (D): ECS03T-249H [manufactured by Nippon Electric Glass Co., Ltd., E glass, glass fibers (chopped strand length 3 mm), substantially perfect circular fiber cross-section (φ10.5 μm), surface-treated with a silane coupling agent]
Antioxidant (E): copper iodide/potassium iodide compound: [AL-120FF manufactured by PolyAd]

TABLE 1

| | | | | Ex. 1 | Ex. 2 | Ex. 3 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|---|---|---|
| (A) | (A1) SPS | 90ZC | mass % | 21.9 | 21.9 | 38.3 | 21.9 | 21.9 | 38.4 | 37.9 | 10.0 | 10.0 | 10.0 |
| | (A2) Aliphatic polyamide | 50BWFS | mass % | 54.8 | 54.7 | 38.3 | 54.9 | 53.9 | 38.4 | 37.9 | 66.8 | 66.6 | 65.8 |
| | mass ratio (A1)/(A2) | | | 29/71 | 29/71 | 50/50 | 29/71 | 29/71 | 50/50 | 50/50 | 13/87 | 13/87 | 13/87 |
| | Content of (A) in composition | | mass % | 76.7 | 76.6 | 76.6 | 76.8 | 75.8 | 76.8 | 75.8 | 76.8 | 76.6 | 75.8 |
| (B) | Metal salt of higher fatty acid | M-132HG | mass % | 0.1 | 0.2 | 0.2 | 0.0 | 1.0 | 0.0 | 1.0 | 0.0 | 0.2 | 1.0 |
| (C) | Compatibilizer | CX-1 | mass % | 3.0 | 3.0 | 3.0 | 3.0 | 3.0 | 3.0 | 3.0 | 3.0 | 3.0 | 3.0 |
| (D) | Inorganic filler | ECS03 T-249H | mass % | 20.0 | 20.0 | 20.0 | 20.0 | 20.0 | 20.0 | 20.0 | 20.0 | 20.0 | 20.0 |
| (E) | Antioxidant | AL120FF | mass % | 0.2 | 0.2 | 0.2 | 0.2 | 0.2 | 0.2 | 0.2 | 0.2 | 0.2 | 0.2 |
| Evaluation | Mold contamination | Evaluation | | A | A | A | D | B | D | B | E | C | B |
| | | State | | oily | oily | oily | needle | oily | needle | oily | needle | needle | oily |
| | | Amount of deposit | | very small | very small | very small | large | small | large | small | very large | small | small |

TABLE 1-continued

| | | | Ex. 1 | Ex. 2 | Ex. 3 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|---|---|
| | Tensile strength retention after immersion in hot water (hot water resistance) | Evaluation | B | C | A | B | E | A | D | D | D | E |
| | | % | 58 | 56 | 61 | 59 | 49 | 63 | 52 | 51 | 50 | 45 |
| Reference | Retention of elongation at break after immersion in hot water | % | 104.2 | 100.5 | 80.7 | | | | | | | |
| | Proportion of gas derived from metal salt of higher fatty acid to the total amount of out-gases | % | 26.7 | 34.4 | 35.3 | 0.0 | 57.1 | 0.0 | 56.7 | 0.0 | 34.6 | 54.3 |

The results of the examples indicate that the styrene resin composition of the present invention has excellent hot water resistance and can prevent contamination of a mold upon molding of the composition.

The invention claimed is:

1. A styrene resin composition comprising: a resin (A) comprising a styrene resin (A1) having a syndiotactic structure and an aliphatic polyamide (A2); 0.07 to 0.2% by mass of aluminum stearate; and a compatibilizer (C) which is compatible with the styrene resin (A1), and has a polar group reactive with the aliphatic polyamide (A2), wherein the compatibilizer (C) is a modified polyphenylene ether, wherein the mass ratio [(A1)/(A2)] between the styrene resin (A1) and the aliphatic polyamide (A2) in the resin (A) is 25/75 to 50/50.

2. The styrene resin composition according to claim 1, wherein the aliphatic polyamide (A2) is polyamide 66.

3. The styrene resin composition according to claim 1, wherein the polar group reactive with the polyamide (A2), contained in the compatibilizer (C), is at least one selected from an acid anhydride group, a carboxylic acid group, a carboxylic acid ester group, a carboxylic acid halide group, a carboxylic acid amide group, a carboxylate group, a sulfonic acid group, a sulfonic acid ester group, a sulfonic acid chloride group, a sulfonic acid amide group, a sulfonate group, an epoxy group, an amino group, an imide group, and an oxazoline group.

4. The styrene resin composition according to claim 1, further comprising an inorganic filler (D).

5. The styrene resin composition according to claim 4, wherein the inorganic filler (D) has been treated with a silane coupling agent or a titanium coupling agent.

6. The styrene resin composition according to claim 4, wherein the inorganic filler (D) is a glass filler.

7. The styrene resin composition according to claim 6, wherein the glass filler is at least one selected from glass fibers, glass powder, glass flakes, milled fibers, glass cloth, and glass beads.

8. The styrene resin composition according to claim 1, further comprising an antioxidant (E).

9. The styrene resin composition according to claim 8, wherein the antioxidant (E) is at least one selected from a copper compound, an iodine compound, a phosphorus compound, a phenol compound, and a sulfur compound.

10. The styrene resin composition according to claim 1, wherein the compatibilizer (C) is fumaric acid-modified polyphenylene ether.

11. The styrene resin composition according to claim 1, wherein the mass ratio [(A1)/(A2)] is 29/71 to 50/50.

12. A molded product comprising the styrene resin composition according to claim 1.

* * * * *